(12) United States Patent
Knaup et al.

(10) Patent No.: US 10,846,144 B2
(45) Date of Patent: Nov. 24, 2020

(54) MULTISTEP AUTOMATED SCALING FOR CLUSTER CONTAINERS

(71) Applicant: D2iQ, Inc., San Francisco, CA (US)

(72) Inventors: Tobias Günter Knaup, San Francisco, CA (US); Christopher John Barkley Gutierrez, San Mateo, CA (US)

(73) Assignee: D2iQ, Inc., San Francisco, CA (US)

( * ) Notice: Subject to any disclaimer, the term of this patent is extended or adjusted under 35 U.S.C. 154(b) by 183 days.

(21) Appl. No.: 15/832,370

(22) Filed: Dec. 5, 2017

(65) Prior Publication Data

US 2019/0171495 A1 Jun. 6, 2019

(51) Int. Cl.
*G06F 9/50* (2006.01)

(52) U.S. Cl.
CPC .......... *G06F 9/5088* (2013.01); *G06F 9/5044* (2013.01)

(58) Field of Classification Search
CPC .................. G06F 9/5088; G06F 9/5044; G06F 2209/508; G06F 9/5011; G06F 9/5061
See application file for complete search history.

(56) References Cited

U.S. PATENT DOCUMENTS

| | | | |
|---|---|---|---|
| 8,788,855 B2 * | 7/2014 | Cong | G06F 1/3206 713/320 |
| 2010/0125477 A1 * | 5/2010 | Mousseau | G06F 9/5077 717/177 |
| 2013/0080641 A1 * | 3/2013 | Lui | H04L 67/10 709/226 |
| 2013/0346614 A1 * | 12/2013 | Baughman | G06F 9/5083 709/226 |
| 2016/0323377 A1 * | 11/2016 | Einkauf | H04L 67/1076 |
| 2017/0111821 A1 * | 4/2017 | Sivakumar | H04W 28/08 |
| 2017/0139462 A1 * | 5/2017 | Potlapally | G06F 1/28 |
| 2017/0316005 A1 * | 11/2017 | Minh | G06F 11/3093 |
| 2018/0287955 A1 * | 10/2018 | Fitzgerald | G06F 9/45558 |
| 2018/0365072 A1 * | 12/2018 | Li | G06F 9/4881 |
| 2019/0102717 A1 * | 4/2019 | Wu | G06Q 10/06375 |

* cited by examiner

*Primary Examiner* — Shanto Abedin
*Assistant Examiner* — Bruce S Ashley
(74) *Attorney, Agent, or Firm* — Van Pelt, Yi & James LLP (57) ABSTRACT

A system for managing a cluster computing system includes a storage system and a processor. The storage system is configured to store a resource usage history for a set of tasks running on a computer cluster comprising a plurality of worker systems. The processor is configured to determine a required resource size for a task of the set of tasks based at least in part on the resource usage history for the task; resize resources allocated to the task to the required resource size; arrange tasks of the set of tasks on the plurality of worker systems to reduce a number of worker systems running tasks; and deallocate worker systems no longer running tasks.

23 Claims, 11 Drawing Sheets

MULTISTEP AUTOMATED SCALING FOR CLUSTER CONTAINERS

BACKGROUND OF THE INVENTION

A cluster computing system comprises a plurality of worker systems running a set of tasks. Typically, the computation resources are allocated at the start of a job by the initiating user of the job. However, a user typically estimates more than enough resources for the job ensuring that the job does not get bottlenecked by the resources allocated to it. This means that clusterwide each job has an overallocation of resources leading to a globally inefficient use of cluster resources.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for managing a cluster system comprises a storage system configured to store a resource usage history for a set of tasks running on a computer cluster comprising a plurality of worker systems. The system for managing a cluster system additionally comprises a processor configured to determine a required resource size for a task of the set of tasks based at least in part on the resource usage history for the task, resize resources allocated to the task to the required resource size, arrange the tasks of the set of tasks on the plurality of worker systems to reduce the number of worker systems running tasks, and to deallocate worker systems no longer running tasks. The system for managing a cluster computing system additionally comprises a memory coupled to the processor and configured to provide the processor with instructions.

A system for managing a cluster computing system comprises a system for efficiently using cluster computing resources. A cluster computing system comprises a cluster system for executing a set of tasks (e.g., running applications, processing data, etc.) using a plurality of worker systems. Each worker system of the plurality of worker systems executes one or more tasks or task elements in parallel. The system for managing a cluster computing system executes a process for efficiently using the worker systems (e.g., reducing the number of worker systems) used to run the set of tasks by using a multistep automated scaling process for cluster containers (e.g., determining required resources based on history, resizing based in determined resources, arranging tasks on workers, and deallocating unused workers).

The system for managing a cluster computing system comprises a storage system configured to store a resource usage history. The resource usage history comprises historical data describing resource usage for a set of tasks, for a set of resources for each task. As the cluster computing system operates, resource usage information is determined and stored in the storage system. Some tasks operate execute with a periodicity of a long time scale (e.g., they are executed once a week, once a month, twice a year, every two years, every ten years, etc.), so data is collected over enough time that the typical resource usage of the task can be well understood. In some cases, the task executes over a short or long time scale (e.g., a minute, an hour, a day, a week, a month, a quarter, a year, etc.). Resource usage data is collected for each of a set of worker system resources (e.g., processor usage, memory usage (e.g., Central Processing Unit (CPU) cache usage, main memory usage, etc.), storage system usage, network bandwidth usage, memory bandwidth usage, available port usage, processor usage, graphics processor unit usage, network bandwidth utilization, etc.)

The system for managing a cluster computing system additionally comprises a processor configured to determine a required resource size for a task of the set of tasks based at least in part on the resource usage history for the task, and resize resources allocated to the task to the required resource size. When a task is initiated, an associated resource allocation is specified. The resource allocation comprises an amount of one or more of the worker system resources that is reserved for the task. For example, a resource allocation for a task comprises 2 processor cores and 8 gigabytes of memory. An initial resource allocation associated with a task is typically determined by a system administrator and comprises an estimate of the required resources for the task. The initial resource allocation can be significantly different from the actual required resources for the task, resulting in inefficient resource utilization if the resource allocation is too high, or in reduced task performance if the resource allocation is too low. The required resource size for the task is determined by accessing a resource usage history for the task from the storage system. A maximum value for the resource usage is determined over a period of time determined to be long enough to capture the full resource usage behavior of the task (e.g., one week, one month, six months, etc.). The required resource size is then determined to be the maximum value for the resource usage multiplied by a scaling factor (e.g., 1.25). The scaling factor allows for deviations from previously seen behavior. Once the required resource size for the task is determined, the resources allocated to the task are resized to the required resource size.

In some embodiments, the required resource size for more than one resource of the set of worker system resources is determined for the task (e.g., the required resource size is determined for each resource of the set of resources that was specified in an initial resource allocation, the required resource size is determined for each resource of a predetermined list of resources, etc.). In some embodiments, one or more required resource sizes is determined for each task of the set of tasks running on the computer cluster. The resources can be more that a single resource—for example, the resource can be memory, number of CPUs, disk space, etc. In some embodiments, a metric is used to measure resources. In some embodiments, the metric is based on a vector that measures multiple resources. In some embodiments, the metric is based on the scarcest resource.

The tasks of the set of tasks running on the computer cluster are then arranged on the plurality of worker systems to reduce the number of worker systems running tasks. The tasks are arranged to efficiently use the resources of the worker systems by consolidating tasks onto a smaller number of worker systems whenever possible. For example, if each worker system has 8 processor cores, and two tasks each require 4 processor cores, the two tasks should be run on one worker system rather than on two worker systems (e.g., assuming that it is not prevented by resource allocation of other resources).

In some embodiments, the tasks of the set of tasks are arranged using a procedure whereby the tasks are selected in order from high to low resource usage, and when a task is selected, it is determined which is the most loaded worker system with available capacity for the task. The task is then moved to that most loaded worker system (e.g., in the event the most loaded worker system comprises a different worker system from the worker system the task is already on).

After the tasks have been arranged, any worker systems no longer running tasks are deallocated (e.g., physical worker systems are shut down, virtual worker system are released).

The system for managing a cluster using a multistep automated scaling improves the functioning of the cluster by lowering operating costs through efficient use of the computation resources (e.g., processing resources, memory resources, etc.).

Figure 1:
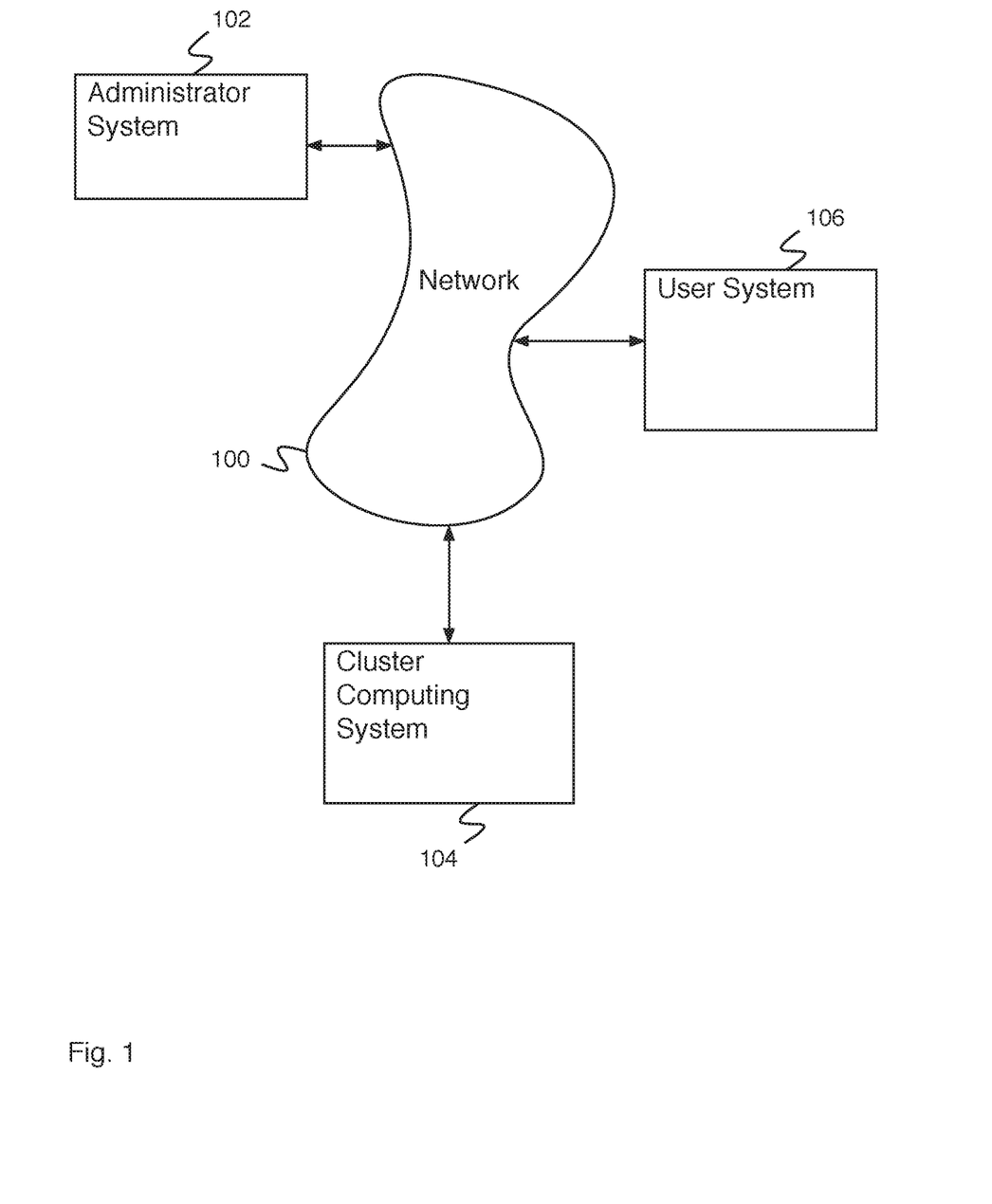
FIG. 1 is a block diagram illustrating an embodiment of a network system.

FIG. 1 is a block diagram illustrating an embodiment of a network system. In some embodiments, the network system of FIG. 1 comprises a system for efficient use of cluster computing resources. In the example shown, a user using user system 106 requests a job be performed by cluster computing system 104 allocating cluster resources. The job joins other jobs executing on cluster computing system 104. Cluster computing system 104 estimates using appropriate related history of past similar or identical jobs. The estimate is used to resize initially allocated resources for the job. The tasks are then arranged on the resources prioritizing the most constrained resources first. Once all tasks are assigned to resources, in the event that there are unused resources, the unused resources are deallocated (e.g., taken off line or reassigned).

FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, cluster computing system 104, and user system 106 communicate via network 100. In the example shown, administrator system 102 comprises an administrator system for use by an administrator. In various embodiments, administrator system 102 comprises an administrator system for executing administrator commands, for executing jobs using cluster computing system 104, for creating jobs using cluster computing system 104, for querying the status of jobs on cluster computing system 104, or for any other appropriate administrator system purpose. Cluster computing system 104 comprises a cluster computing system for executing cluster computing jobs. In various embodiments, cluster computing system 104 comprises a computer, a multiprocessor computer, a plurality of computers, a plurality of multiprocessor computers, or any other appropriate cluster computing system. In some embodiments, cluster computing system 104 comprises a plurality of individual cluster systems. User system 106 comprises a user system for use by a cluster computing system user. A cluster computing system user requests jobs on cluster computing system 104 via user system 106. In some embodiments, a plurality of users request jobs via a plurality of user systems to be executed by one or more cluster computing systems. In various embodiments, individual users are assigned individual cluster systems, individual users are assigned individual computers within a cluster system, individual users share computers within a cluster system, or users are divided among cluster systems in any other appropriate way.

Cluster computing system 104 comprises a system for efficient use of cluster computing resources. The system for efficient use of cluster computing resources comprises a storage system for storing resource usage history data. As cluster computing system 104 executes tasks, data describing the resource usage of the tasks is stored in the storage system. The resource usage history data is used to make an estimate of resources required to run tasks. The system for efficient use of cluster computing resources additionally comprises a processor configured to determine a required resource size for a task of a set of tasks based at least in part on the resource usage history for the task, and to resize resources allocated to the task to the required resource size. The resource allocation for one or more tasks is resized to the required resource allocation based at least in part on the resource usage history. The processor is additionally configured to arrange the tasks of the set of tasks on the worker systems of cluster computing system 104 to reduce the number of worker systems running tasks, and to deallocate worker systems no longer running tasks. The tasks are arranged for efficient usage of the worker system resource capacity, enabling excess capacity to be released.

Figure 2A:
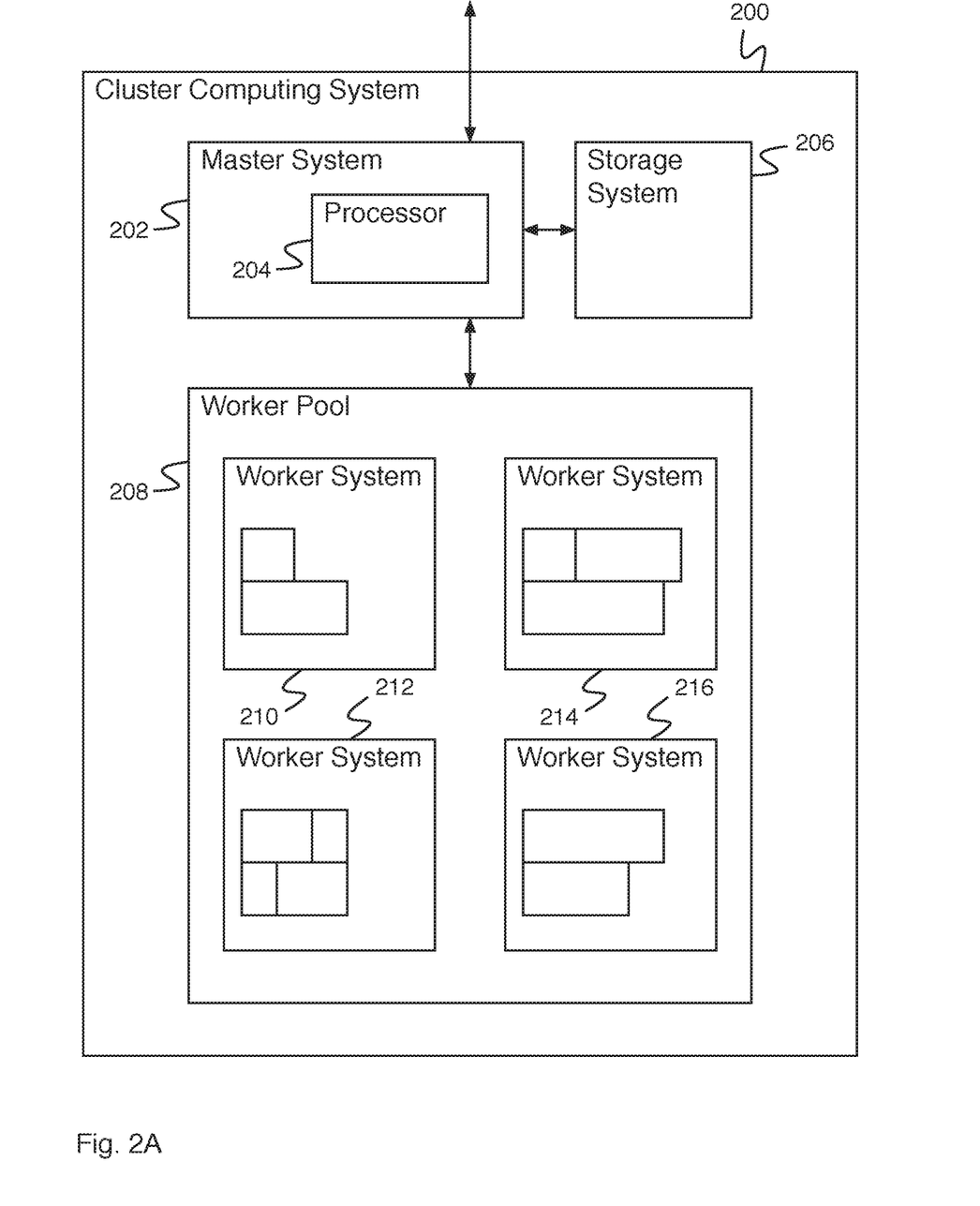
FIG. 2A is a block diagram illustrating an embodiment of a cluster computing system.

FIG. 2A is a block diagram illustrating an embodiment of a cluster computing system. In some embodiments, cluster computing system 200 comprises cluster computing system 104 of FIG. 1. In some embodiments, cluster computing system 200 comprises a system for efficient use of cluster computing resources. In the example shown, cluster computing system 200 comprises master system 202. Master system 202 comprises processor 204. Master system 202 comprises a system for receiving an indication of a job to run, indicating to a worker system (e.g., a worker system of worker pool 208) to execute a task, for dividing a job into a set of tasks, for assembling a set of task results into a job result, for receiving task resource usage data from a worker system, for providing task resource usage data to storage system 206, for determining a required resource size to run a task from task resource data stored in storage system 206, for resizing resources allocated to a task to a required resource size, for arranging tasks of a set of tasks on the worker systems of worker pool 208, for deallocating worker systems of worker pool 208 not running tasks, etc. In some embodiments, master system 202 comprises a system for receiving a performance target for a task of a set of tasks. Worker pool 208 comprises a set of worker systems (e.g., worker system 210, worker system 212, worker system 214, worker system 216). Worker pool 208 comprises any appropriate number of worker systems (e.g., 1 worker system, 4 worker systems, 10 worker systems, 72 worker systems, etc.) and the number of worker systems can be increased or decreased as necessary. Each worker system runs a set of tasks utilizing a portion of its resource capacity.

Figure 2B:
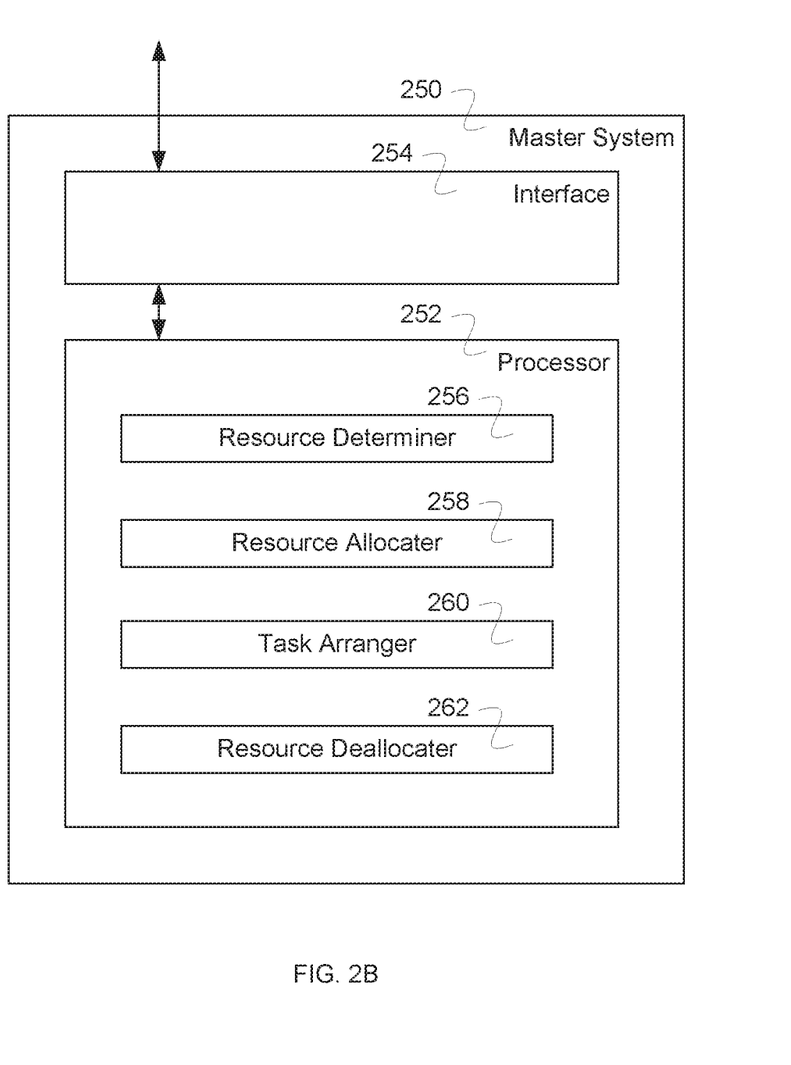
FIG. 2B is a diagram illustrating an embodiment of a master system.

FIG. 2B is a diagram illustrating an embodiment of a master system. In some embodiments, master system 250 and processor 252 are used to implement master system 202 and processor 204 of FIG. 2A. In the example shown, master system 250 receives a request via interface 254 to process a job. Histories of similar jobs are retrieved and used by resource determiner 256 of processor 252 to determine estimate of resources for the job. The estimate is used to resize allocation of resources using resource allocater 258 of processor 252. After resizing allocation, task arranger 260 to rearrange the tasks within remaining resources by fitting using most constrained resources first (e.g., the least available resource). In some cases, the tasks are placed in the smallest available resource. For now freed resources, the resources are deallocated using resource deallocater 262.

Figure 3:
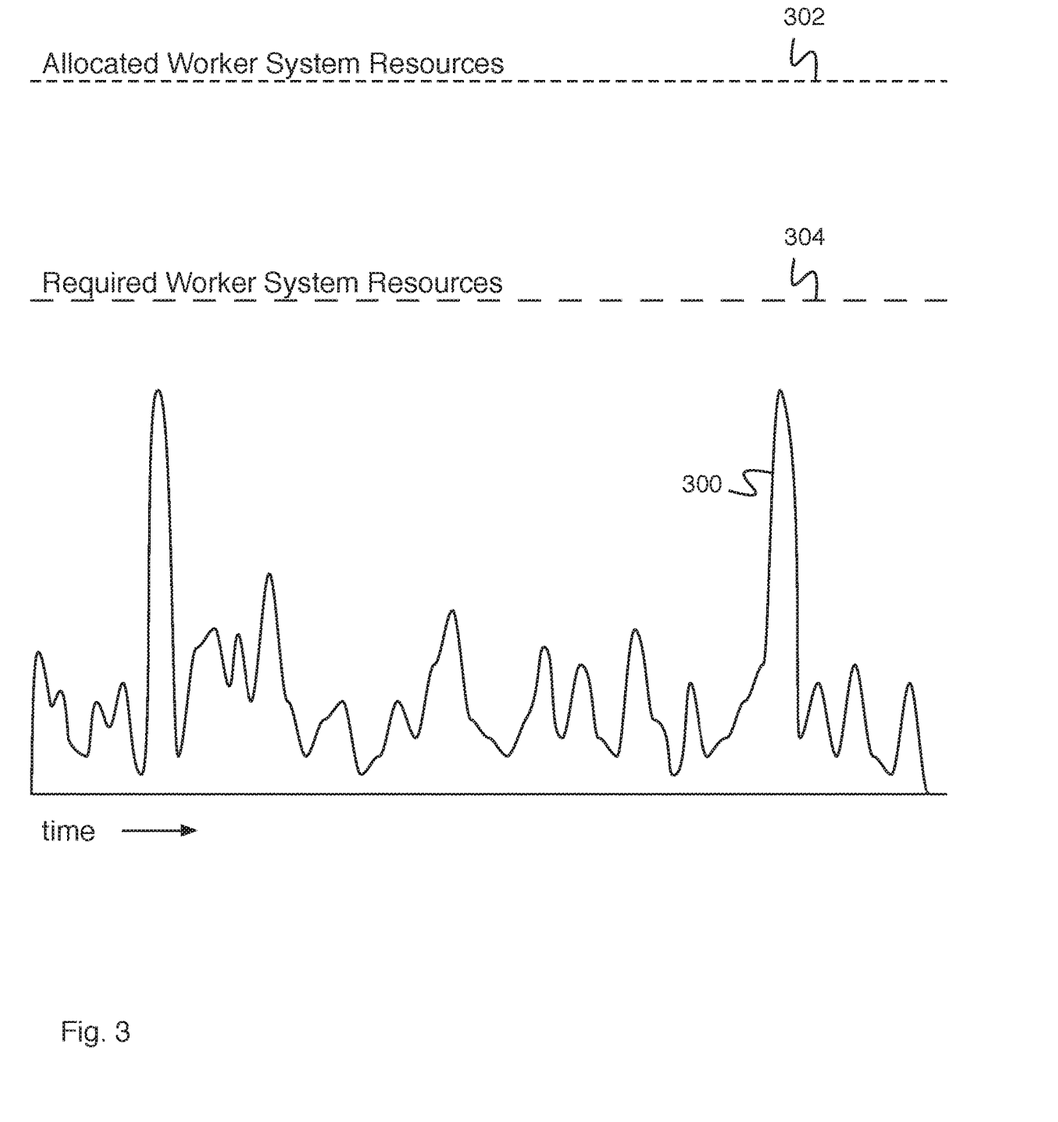
FIG. 3 is a diagram illustrating an embodiment of a determination of a required resource size.

FIG. 3 is a diagram illustrating an embodiment of a determination of a required resource size. In some embodiments, the determination of a required resource size is performed by resource determiner 256 of FIG. 2B. In the example shown, line 300 indicates resource usage history data (e.g., stored on a storage system of a cluster system). The resource usage history data comprises historical data describing the usage of a particular resource by a particular task over time. The data shown by line 300 comprises data over any appropriate period of time—for example, one hour, one day, two weeks, one month, six months, two years, etc. In the example shown, the data has a normal range of resource usage as well as large peaks that far exceed the normal range of resource usage. In order for the task to have enough resource capacity at all times, the resources allocated need to be enough to handle the peak demand. Line 302 indicates allocated worker system resources for the task. In the example shown, the allocated worker system resources for the task is considerably higher than the peak resource usage. Line 304 indicates required worker system resources for the task. The required worker system resources for the task is determined to be the peak value of the historical resource usage multiplied by a multiplier. The multiplier comprises a buffer allowing the task to exceed the historical peak usage by a small amount without running out of resources. For example, the multiplier comprises a value of 1.25. In the example shown, the required worker system resources is lower than the allocated worker system resources, indicating that the original allocation resulted in an inefficient use of resources.

Figure 4A:
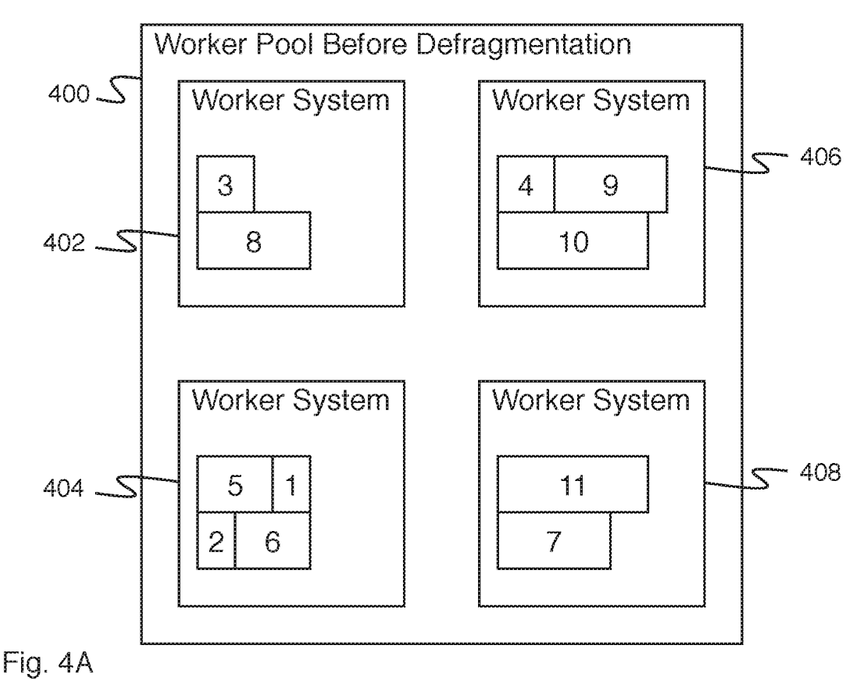
FIGS. 4A and 4B are diagrams illustrating an embodiment of a worker pool before and after defragmentation, respectively.
Figure 4B:
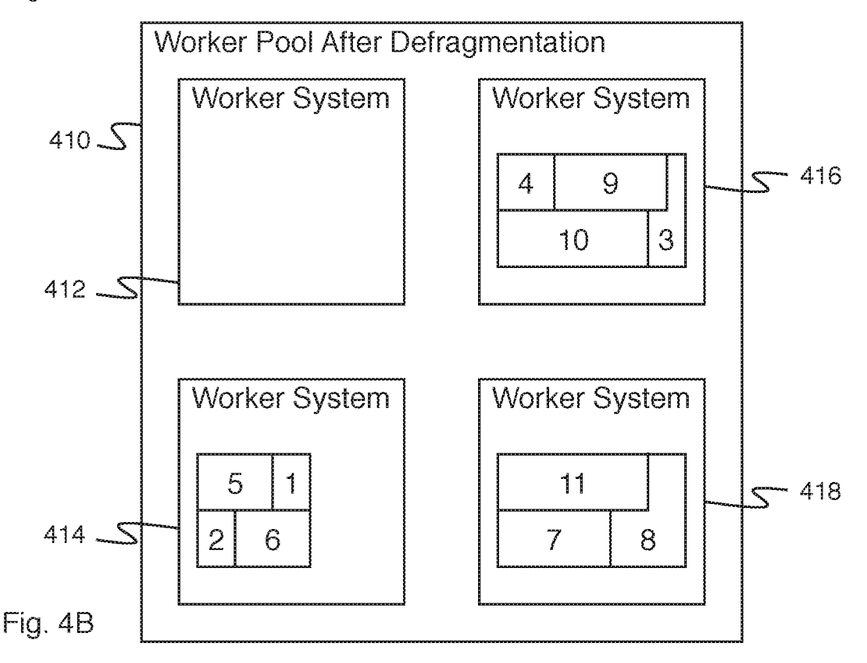

FIGS. 4A and 4B are diagrams illustrating an embodiment of a worker pool before and after defragmentation, respectively. In some embodiments, worker pool before defragmentation 400 and worker pool after defragmentation comprise instances of worker pool 208 of FIG. 2A. In some embodiments, defragmentation comprises arranging tasks of a set of tasks on worker systems of a cluster computing system to reduce the number of worker systems running tasks. In the example shown, worker pool before defragmentation 400 comprises worker system 402, worker system 404, worker system 406, and worker system 408. Worker system 402 is running tasks 3 and 8, worker system 404 is running tasks 1, 2, 5, and 6, worker system 406 is running tasks 4, 9, and 10, and worker system 408 is running tasks 7 and 11. Tasks are numbered from smallest to largest resource usage. Worker pool after defragmentation 410 corresponds to worker pool before defragmentation 400, after a defragmentation process has been executed. Worker system 412 corresponds to worker system 402 after the defragmentation process has been executed, worker system 414 corresponds to worker system 404 after the defragmentation process has been executed, worker system 416 corresponds to worker system 406 after the defragmentation process has been executed, and worker system 418 corresponds to worker system 408 after the defragmentation process has been executed. In the example shown, task 3 and task 8 have been moved. Worker system 412 is running no tasks, worker system 416 is running tasks 3, 4, 9, and 10, and worker system 418 is running tasks 7, 8, and 11. In some cases, the largest task (e.g., 8) is moved to the smallest available but still adequate resource (e.g., worker system 408 to become worker system 418). Then the next largest task (e.g., 3) is moved to the smallest available but still adequate resource (e.g., worker system 406 to become worker system 416). Worker system 414 is unchanged and is running tasks 1, 2, 5, and 6. In the example shown, the goal of defragmentation to reduce the number of worker systems running tasks has been accomplished.

Figure 4C:
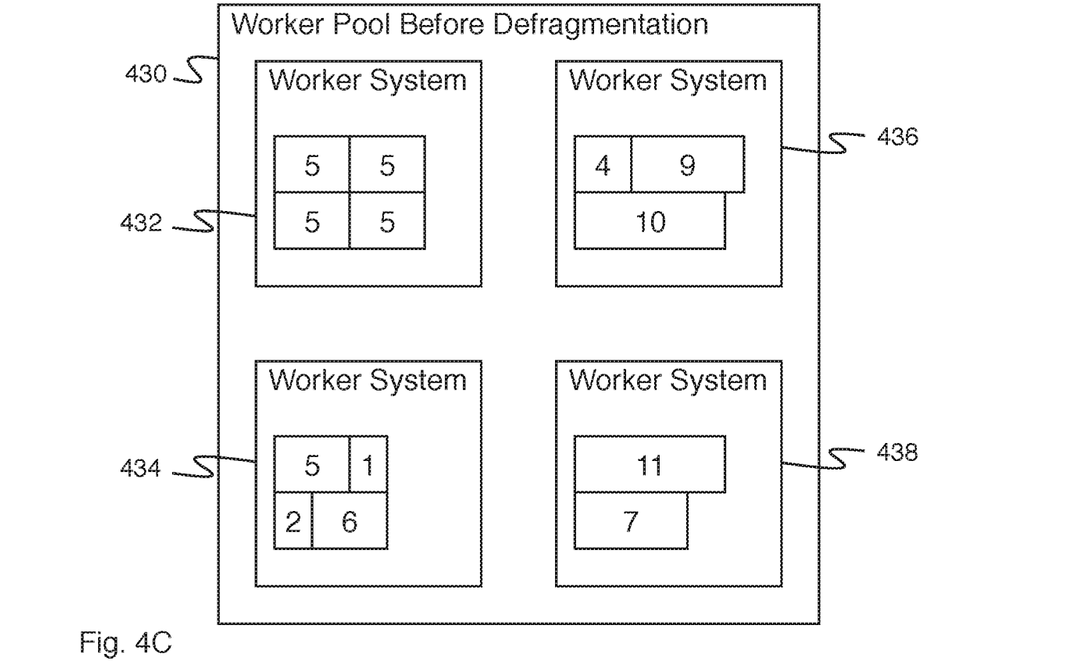
FIGS. 4C and 4D are diagrams illustrating an embodiment of a worker pool before and after defragmentation, respectively.
Figure 4D:
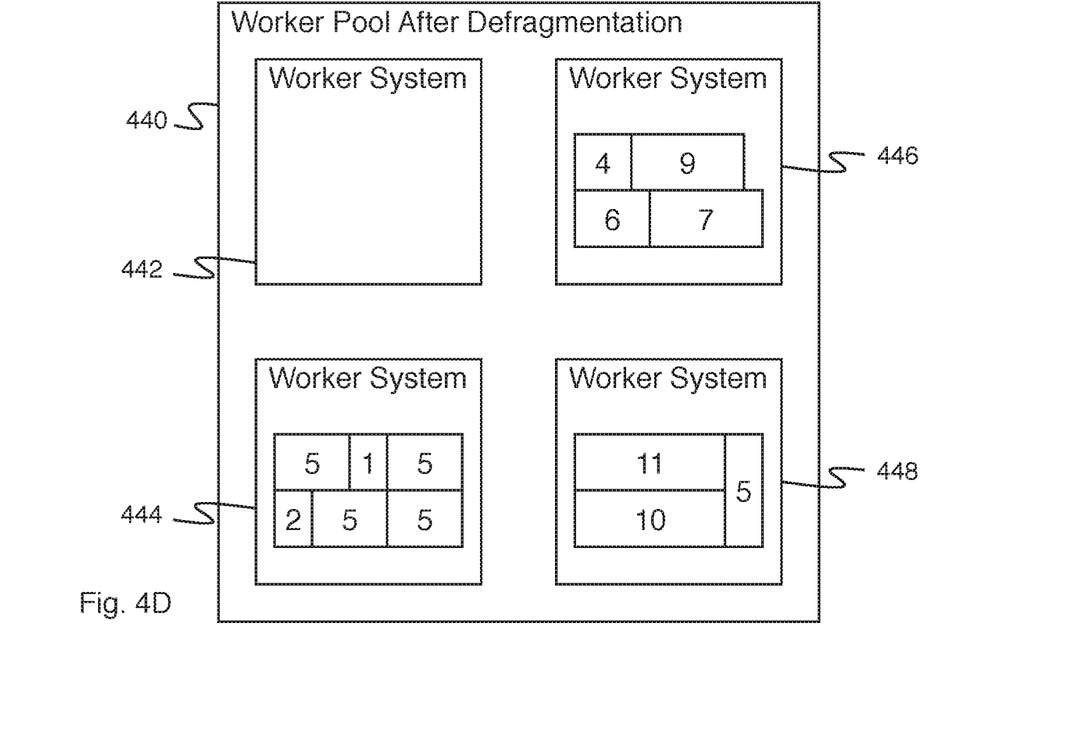

FIGS. 4C and 4D are diagrams illustrating an embodiment of a worker pool before and after defragmentation, respectively. In some embodiments, worker pool before defragmentation 430 and worker pool after defragmentation comprise instances of worker pool 208 of FIG. 2A. In some embodiments, defragmentation comprises arranging tasks of a set of tasks on worker systems of a cluster computing system to reduce the number of worker systems running tasks. In the example shown, worker pool before defragmentation 430 comprises worker system 432, worker system 434, worker system 436, and worker system 438. Worker system 432 is running tasks 5, 5, 5, and 5, worker system 434 is running tasks 1, 2, 5, and 6, worker system 436 is running tasks 4, 9, and 10, and worker system 438 is running tasks 7 and 11. Tasks are numbered from smallest to largest resource usage. Worker pool after defragmentation 440 corresponds to worker pool before defragmentation 430, after a defragmentation process has been executed. Worker system 442 corresponds to worker system 432 after the defragmentation process has been executed, worker system 444 corresponds to worker system 434 after the defragmentation process has been executed, worker system 446 corresponds to worker system 436 after the defragmentation process has been executed, and worker system 448 corresponds to worker system 438 after the defragmentation process has been executed. In the example shown, tasks 5, 5, 5, and 5 have been moved. Worker system 442 is running no tasks, worker system 446 is running tasks 4, 6, 7, and 9 and worker system 448 is running tasks 5, 10, and 11. Worker system 444 is running tasks 1, 2, 5, 5, and 5. The final result for placement of tasks is done placing the tasks starting anew. This new placement might involve shuffling tasks between worker systems. The moves between worker systems should be determined as a separate process to be as efficient as possible. In the example shown, the goal of defragmentation to reduce the number of worker systems running tasks has been accomplished.

Figure 5A:
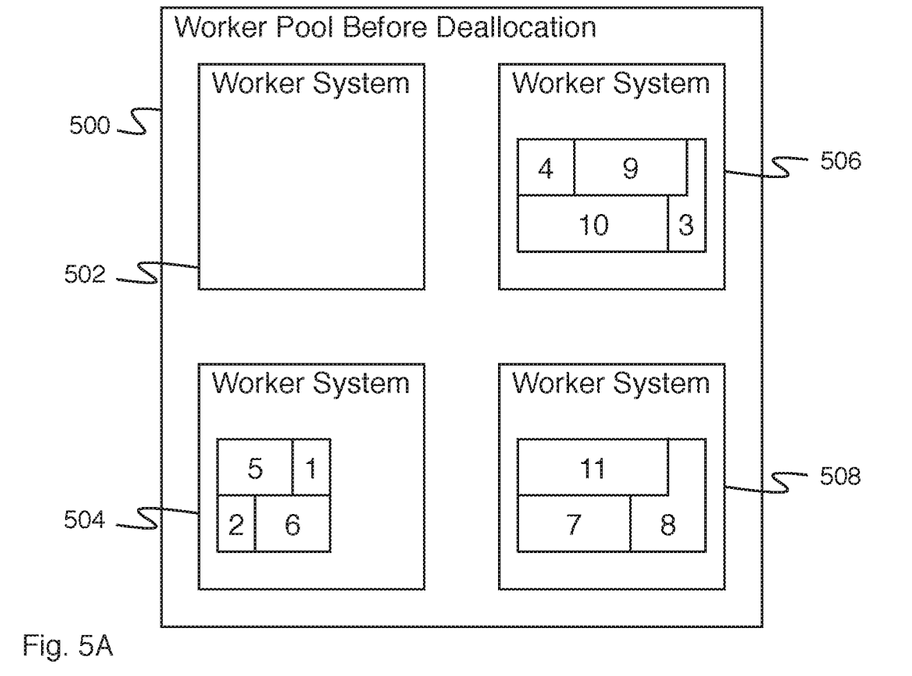
FIGS. 5A and 5B are diagrams illustrating an embodiment of a worker pool before and after deallocation, respectively.
Figure 5B:
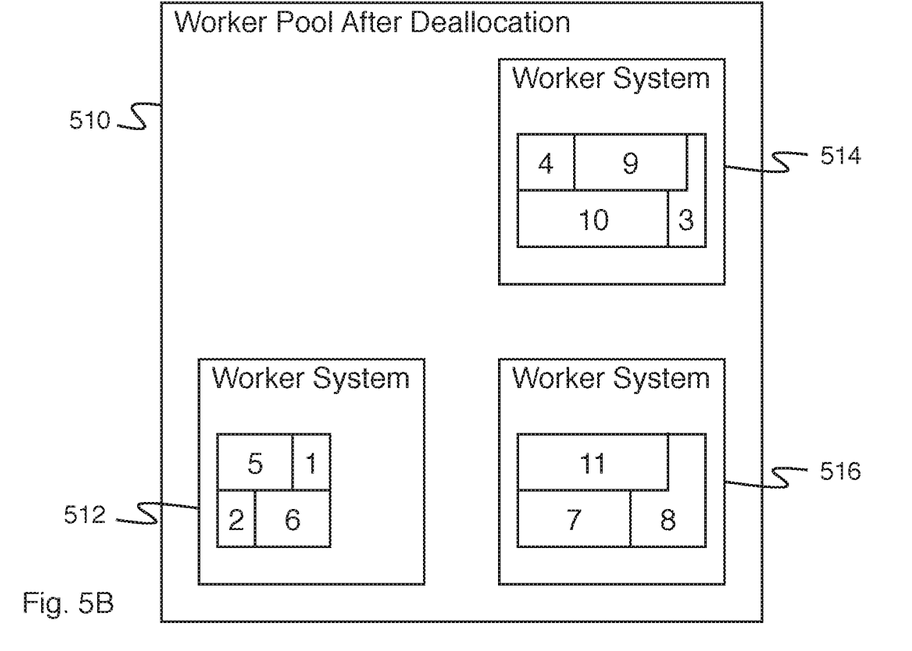

FIGS. 5A and 5B are diagrams illustrating an embodiment of a worker pool before and after deallocation, respectively. In the example shown, worker pool before deallocation 500 comprises worker pool after defragmentation 410 of FIG. 4B. Worker pool before deallocation 500 comprises worker system 502, worker system 504, worker system 506, and worker system 508. Worker system 502 is running no tasks and is available for deallocation. Worker pool after deallocation 510 corresponds to worker pool before deallocation 500 after a deallocation process has been executed. Worker system 512 corresponds to worker system 504, worker system 514 corresponds to worker system 506, and worker system 516 corresponds to worker system 508. No system is present in worker pool after deallocation 510 corresponding to worker system 502, as it has been deallocated.

Figure 6:
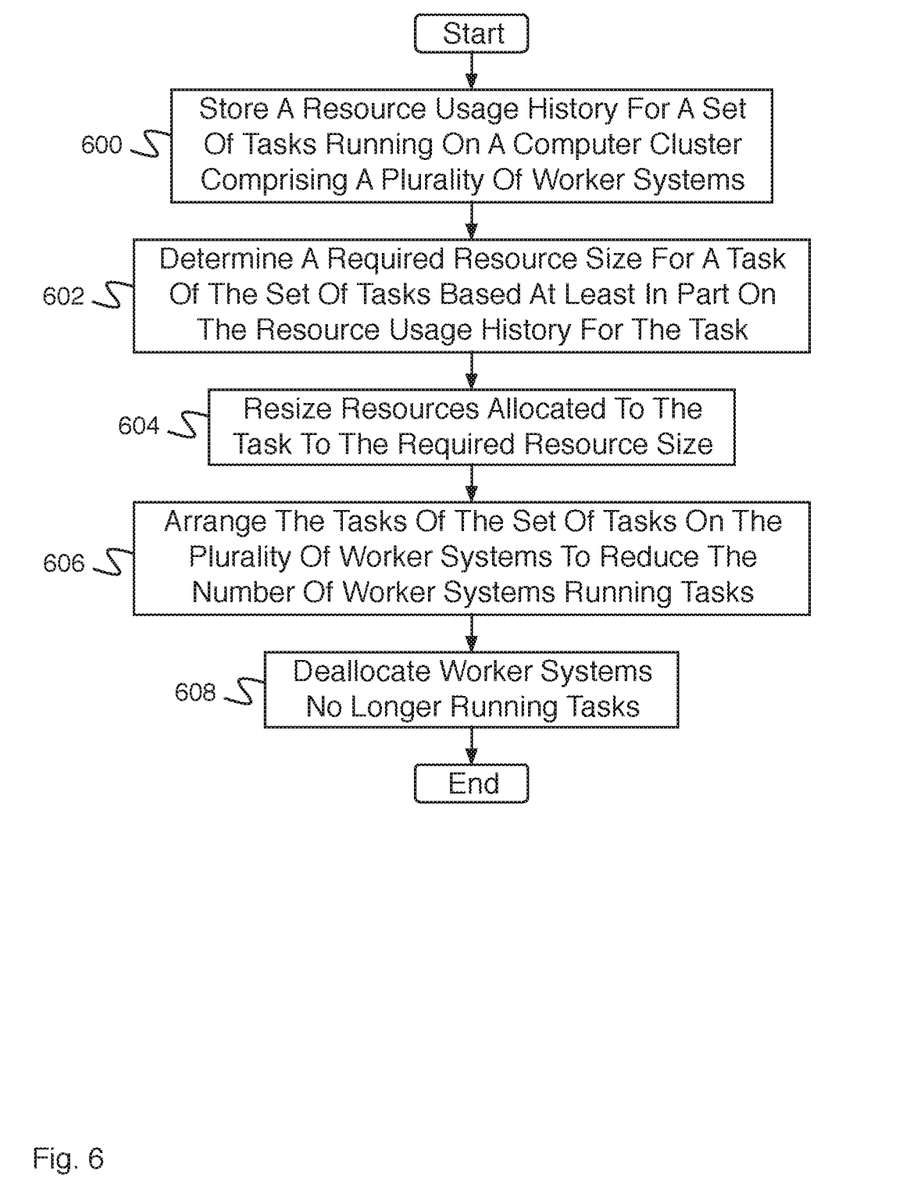
FIG. 6 is a flow diagram illustrating an embodiment of a process for managing a cluster computing system.

FIG. 6 is a flow diagram illustrating an embodiment of a process for managing a cluster computing system. In some embodiments, the process of FIG. 6 is executed by cluster computing system 104 of FIG. 1. In the example shown, in 600, a resource usage history for a set of tasks running on a computer cluster comprising a plurality of worker systems is stored. In 602, a required resource size for a task of the set of tasks is determined based at least in part on the resource usage history for the task. In 604, resources allocated to the task are resized to the required resource size. In 606, the tasks of the set of tasks are arranged on the plurality of worker systems to reduce the number of worker systems running tasks. For example, placing the tasks by moving tasks from one of the least used worker systems and redistributing them to other worker systems. In some cases, the redistribution is done leaving the already distributed tasks in place and taking the tasks from the one of the least used worker systems and allocating them on top of the already distributed tasks. In other cases, the redistribution is done starting anew taking all the tasks already distributed and redistributing them over a reduced set of worker systems. In 608, worker systems no longer running tasks are deallocated.

Figure 7:
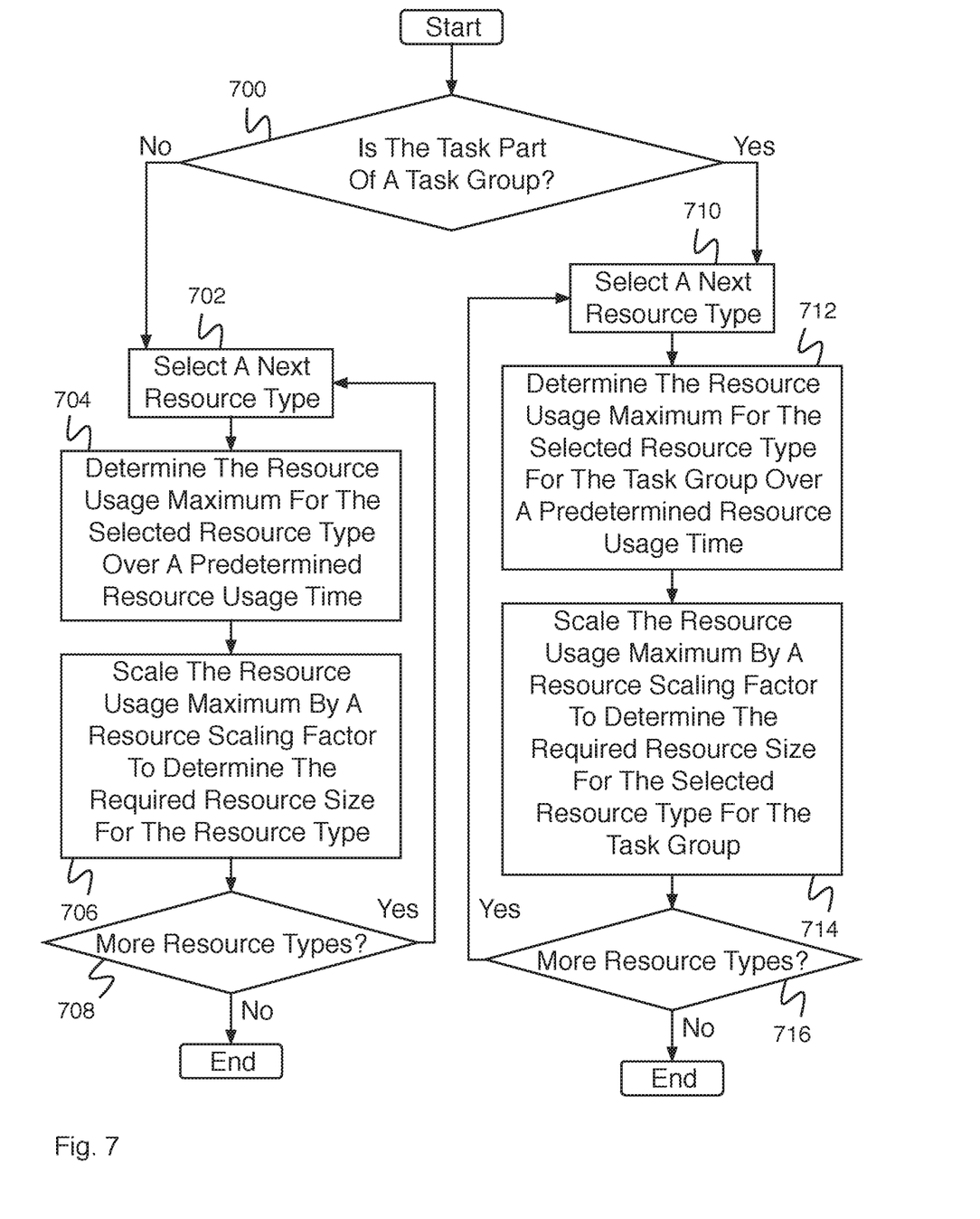
FIG. 7 is a flow diagram illustrating an embodiment of a process for determining a required resource size for a task of a set of tasks based at least in part on a resource usage history for the task.

FIG. 7 is a flow diagram illustrating an embodiment of a process for determining a required resource size for a task of a set of tasks based at least in part on a resource usage history for the task. In some embodiments, the process of FIG. 7 implements 602 of FIG. 6. In the example shown, in 700, it is determined whether the task is part of a task group. For example, a task group comprises multiple instances of the same task or a group of related tasks that should all have the same resource allocation. In the event it is determined that the task is not part of a task group, control passes to 702. In 702, a next resource type is selected. For example, a next resource type of a set of resource types that are allocated for the task is selected, a next resource type of a predetermined set of resource types is selected, etc. In 704, the resource usage maximum is determined for the selected resource over a predetermined resource usage time. In 706, the resource usage maximum is scaled by a resource scaling factor to determine the required resource size for the resource type. In 708, it is determined whether there are more resource types. In the event it is determined that there are more resource types, control passes to 702. In the event it is determined that there are not more resource types, the process ends.

In the event it is determined in 700 that the task is part of a task group, control passes to 710. In 710, a next resource type is selected. For example, a next resource type of a set of resource types that are allocated for the task is selected, a next resource type of a predetermined set of resource types is selected, etc. In 712, the resource usage maximum is determined for the selected resource type for the task group over a predetermined resource usage time. In 714, the resource usage maximum is scaled by a resource scaling factor to determine the required resource size for the selected resource type for the task group. In 716, it is determined whether there are more resource types. In the event it is determined that there are more resource types, control passes to 710. In the event it is determined that there are not more resource types, the process ends.

In some embodiments, the resource scaling factor comprises a fixed resource scaling factor (e.g., 1.1, 1.25, 1.5, etc.). In some embodiments, the resource scaling factor is based at least in part on available worker system resources. In some embodiments, the required resource size comprises a projected required resource size (e.g., the resource usage history indicated a trending behavior and a projected required resource size is determined based at least in part on the trending behavior). In some embodiments, the resource scaling factor is based at least in part on a trending behavior. In some embodiments, the required resource size is based at least in part on a performance target for a task (e.g., a relationship between resource allocation and task performance is determined based at least in part on the resource usage history and a performance history, and the required resource size is determined using the relationship and a performance target).

Figure 8:
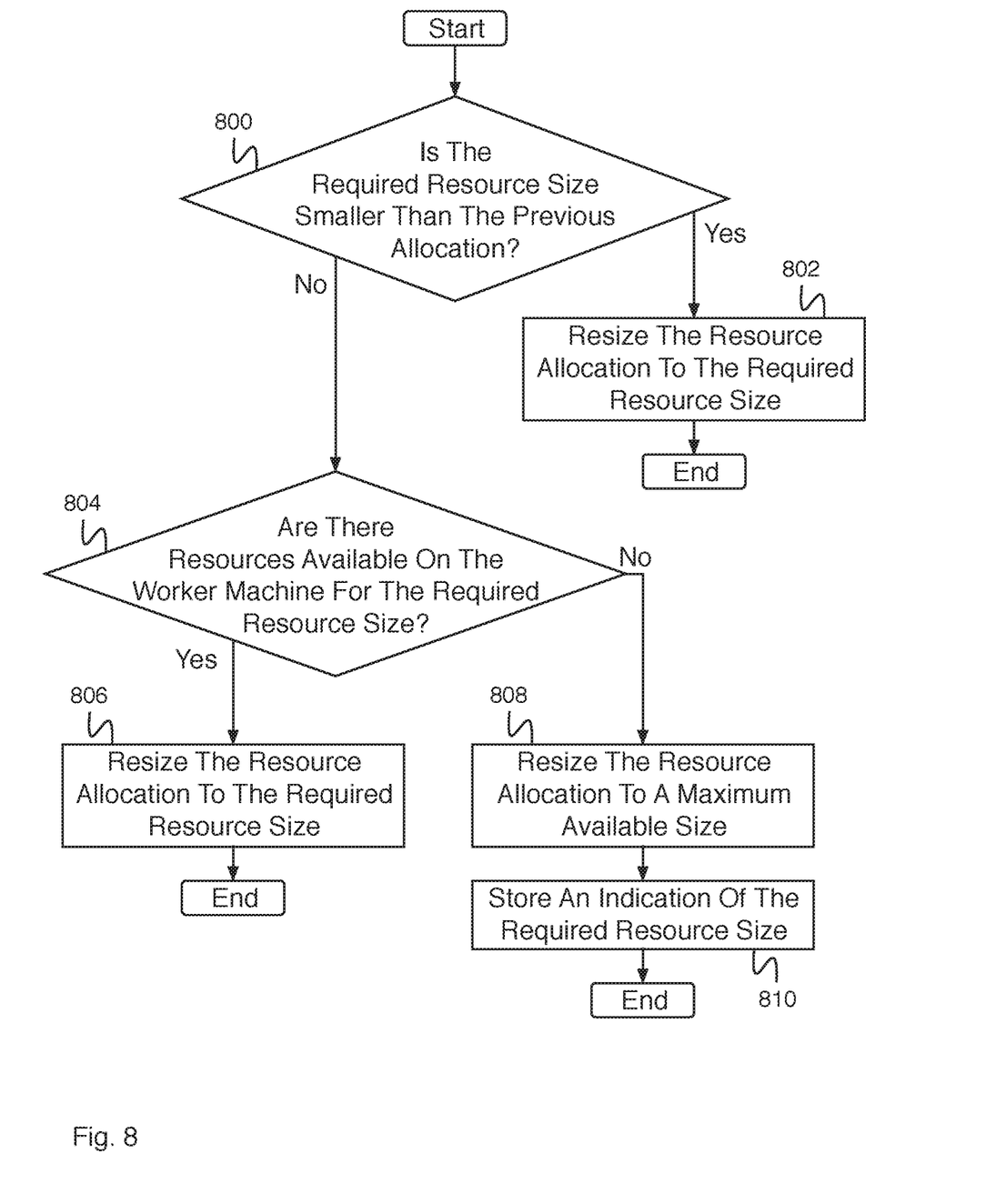
FIG. 8 is a flow diagram illustrating an embodiment of a process for resizing resources allocated to a task to a required resource size.

FIG. 8 is a flow diagram illustrating an embodiment of a process for resizing resources allocated to a task to a required resource size. In some embodiments, the process of FIG. 8 implements 604 of FIG. 6. In the example shown, in 800, it is determined whether the required resource size is smaller than the previous allocation. In the event it is determined that the required resource size is smaller than the previous allocation, control passes to 802. In 802, the resource allocation is resized to the required resource size, and the process ends. In the event it is determined in 800 that the required resource size is not smaller than the previous allocation, control passes to 804. In 804 it is determined whether there are resources available on the worker machine for the required resource size. In the event it is determined that there are resources available on the worker machine for the required resource size, control passes to 806. In 806, the resource allocation is resized to the required resource size, and the process ends. In the event it is determined in 804 that there are not resources available on the worker machine for the required resource size, control passes to 808. In 808, the resource allocation is resized to a maximum available size. In 810, an indication of the required resource size is stored.

In some embodiments, resizing a resource allocation for a task to a required resource size (e.g., in 802 or 806) comprises stopping the task and restarting the task with the task resource allocation set to the required resource size. In various embodiments, the task is restarted using the same resource (e.g., on the same worker) or the task is restarted using a different resource (e.g., on a different worker) or the task is restarted on more than one worker or any other appropriate resource or combination of resources. In some embodiments, resizing a resource allocation for a task to a required resource size (e.g., in 802 or 806) comprises resizing the resources allocated to the task without stopping the task.

Figure 9:
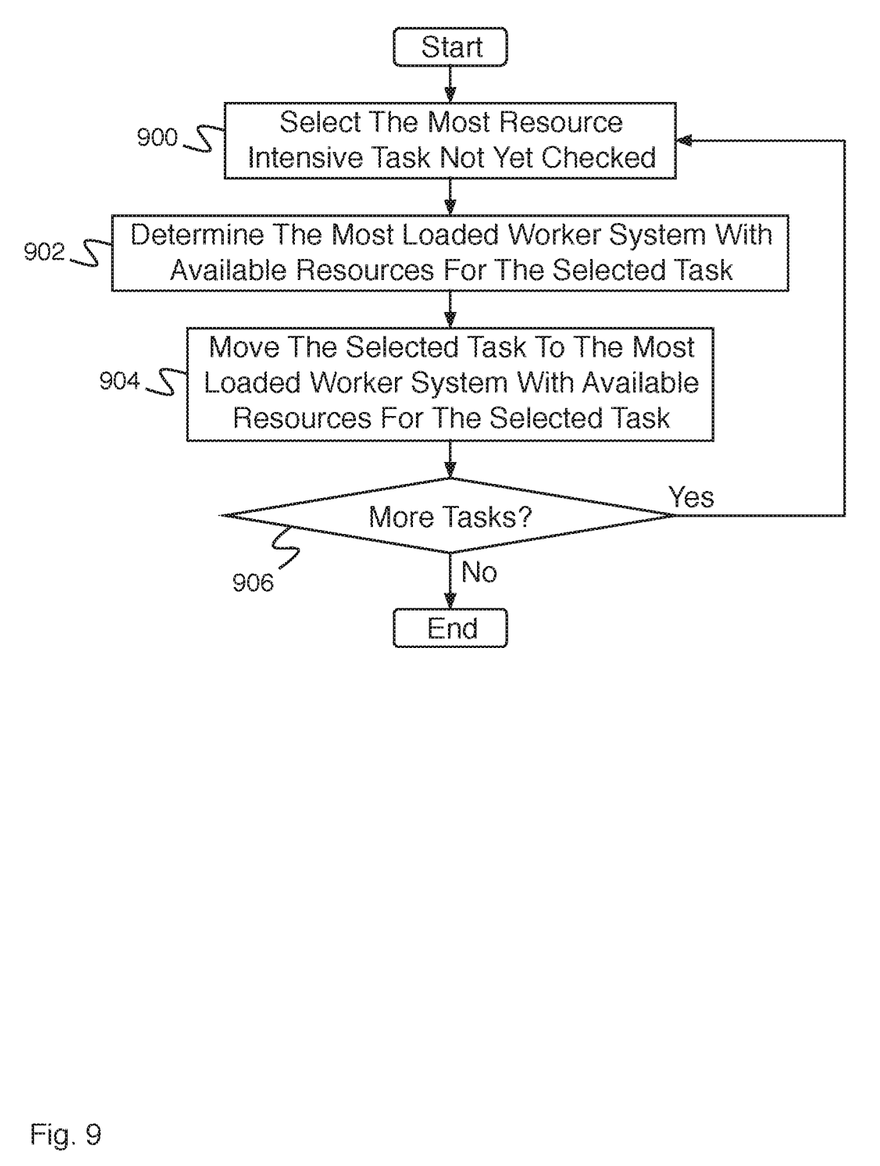
FIG. 9 is a flow diagram illustrating an embodiment of a process for, arranging tasks of a set of tasks on a plurality of worker systems to reduce the number of worker systems running tasks.

FIG. 9 is a flow diagram illustrating an embodiment of a process for, arranging tasks of a set of tasks on a plurality of worker systems to reduce the number of worker systems running tasks. In some embodiments, the process of FIG. 9 implements 606 of FIG. 6. In the example shown, in 900, the most resource intensive task not yet checked is selected. In 902, the most loaded cluster worker with available resources for the selected task is determined. In 904, the selected task is moved to the most loaded worker system with available resources for the selected task. For example, the selected task is moved to the most loaded worker system with available resources for the selected task in the event the most loaded worker system with available resources for the selected task comprises a different worker system than the worker system the selected task is already running on. In 906, it is determined whether there are more tasks. In the event it is determined that there are more tasks, control passes to 900. In the event it is determined that there are not more tasks, the process ends.

In some embodiments, the most resource intensive task comprises the most resource intensive task for the most constrained resource. For each resource, a resource availability factor can be calculated as 1 minus the sum of the task requirements for the resource divided by the sum of the available resources. The most constrained resource comprises the resource with the smallest resource availability factor. For example, if a group of tasks together requires 10 processors, and the cluster comprises a total of 12 processors, the resource availability factor is $1-10/12$, or $1/6$.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for managing a cluster computing system, comprising:
 a storage system configured to:
  store a resource usage history for a set of tasks running on a computer cluster comprising a plurality of worker systems;
 a processor configured to:
  determine required resource sizes for a task of the set of tasks based at least in part on the resource usage history for the task;
  resize resources allocated to the task to the required resource sizes;
  determine a resource of the resources having a smallest resource availability factor;
  arrange tasks of the set of tasks on the plurality of worker systems to reduce a number of worker systems running tasks, comprising to:
   select an unchecked task of the set of tasks in an order of high to low resource usage for the resource, wherein a first worker system of the plurality of worker systems runs the unchecked task;
   select a second worker system of the plurality of worker systems in an order of high to low loading for the resource;
   move the unchecked task to the second worker system in response to a determination that the second worker system has available capacity for the required resource size of the resource for the unchecked task, wherein the first worker system is different from the second worker system; and
   deallocate worker systems no longer running tasks.

2. The system of claim 1, wherein the required resource size for the task is based at least in part on resource usage history over a period of a day, a week, a month, or a year.

3. The system of claim 1, wherein the required resource size for the task is based at least in part on a maximum observed resource usage.

4. The system of claim 1, wherein the resource of the resources allocated to the task comprises one of a memory utilization, storage system utilization, a processor utilization, a graphics processing unit utilization, memory bandwidth utilization, available port usage, or a network bandwidth utilization.

5. The system of claim 1, wherein resizing the resources allocated to the task comprises reducing an amount of resources allocated to the task.

6. The system of claim 1, wherein resizing the resources allocated to the task comprises increasing an amount of resources allocated to the task.

7. The system of claim 6, wherein increasing the amount of resources allocated to the task comprises determining whether resources are available to increase the amount of resources allocated to the task to the required resource size.

8. The system of claim 7, wherein, in response to determining that the resources are not available, the amount of resources allocated to the task are increased to a maximum available size.

9. The system of claim 7, wherein, in response to determining that the resources are not available, an indication of the required resource size for the task is stored.

10. The system of claim 1, wherein resizing the resources allocated to the task to the required resource size comprises stopping the task and restarting the task with the resource allocation set to the required resource size.

11. The system of claim 1, wherein resizing the resources allocated to the task to the required resource size comprises resizing the resources allocated to the task without stopping the task.

12. The system of claim 1, wherein the processor is further configured to determine a single required resource size for all tasks of a task group, wherein the task group comprises a subset of the set of tasks comprising multiple instances of a same task or a group of related tasks.

13. The system of claim 1, wherein the required resource size comprises a projected required resource size.

14. The system of claim 1, wherein deallocating cluster machines no longer running tasks comprises shutting down one or more physical worker systems no longer running tasks.

15. The system of claim 1, wherein deallocating cluster machines no longer running tasks comprises releasing one or more virtual worker systems no longer running tasks.

16. The system of claim 1, wherein the processor is further configured to receive a performance target for the task of the set of tasks.

17. The system of claim 16, wherein the required resource size for the task is based at least in part on the performance target.

18. The system of claim 1, wherein the required resource size is determined for each task of the set of tasks.

19. The system of claim 18, wherein resources allocated to each task of the set of tasks are resized according to the required resource size.

20. The system of claim 1, wherein the loading of the second worker system is based at least in part on the available capacity of the second worker system.

21. The system of claim 1, wherein the resource availability factor is a percentage of the available resources of the plurality of worker systems not allocated to the set of tasks.

22. A method for managing a cluster computing system, comprising:
   storing a resource usage history for a set of tasks running on a computer cluster comprising a plurality of worker systems;
   determining, using a processor, required resource sizes for a task of the set of tasks based at least in part on the resource usage history for the task;
   resizing resources allocated to the task to the required resource sizes;
   determining a resource of the resources having a smallest resource availability factor;
   arranging the set of tasks on the plurality of worker systems to reduce a number of worker systems running tasks, comprising:
      selecting an unchecked task of the set of tasks in an order of high to low resource usage for the resource, wherein a first worker system of the plurality of worker systems runs the unchecked task;
      selecting a second worker system of the plurality of worker systems in an order of high to low loading for the resource;
      moving the unchecked task to the second worker system in response to a determination that the second worker system has available capacity for the required resource size of the resource for the unchecked task, wherein the first worker system is different from the second worker system; and
   deallocating worker systems no longer running tasks.

23. A computer program product for managing a cluster computing system, the computer program product being embodied in a non-transitory computer readable storage medium and comprising computer instructions for:
   storing a resource usage history for a set of tasks running on a computer cluster comprising a plurality of worker systems;
   determining required resource sizes for a task of the set of tasks based at least in part on the resource usage history for the task;
   resizing resources allocated to the task to the required resource sizes;
   determining a resource of the resources having a smallest resource availability factor;
   arranging the set of tasks on the plurality of worker systems to reduce a number of worker systems running tasks, comprising:
      selecting an unchecked task of the set of tasks in an order of high to low resource usage for the resource, wherein a first worker system of the plurality of worker systems runs the unchecked task;
      selecting a second worker system of the plurality of worker systems in an order of high to low loading for the resource;
      moving the unchecked task to the second worker system in response to a determination that the second worker system has available capacity for the required resource size of the resource for the unchecked task, wherein the first worker system is different from the second worker system; and
   deallocating worker systems no longer running tasks.

* * * * *